United States Patent [19]

Wong

[11] Patent Number: 5,737,006
[45] Date of Patent: Apr. 7, 1998

[54] SCANNING METHOD AND APPARATUS FOR BANDING SUPPRESSION

[75] Inventor: Lam F. Wong, Fairport, N.Y.

[73] Assignee: Xerox Corporation, Stamford, Conn.

[21] Appl. No.: 427,359

[22] Filed: Apr. 24, 1995

[51] Int. Cl.$^6$ ................................ B41J 2/47; B41J 2/435
[52] U.S. Cl. ................................ 347/235; 347/237
[58] Field of Search ................................ 347/233, 235, 347/224, 225, 243

[56] References Cited

U.S. PATENT DOCUMENTS

| | | | |
|---|---|---|---|
| 4,547,038 | 10/1985 | Mori | 350/6.5 |
| 4,637,679 | 1/1987 | Funato | 350/6.5 |
| 4,796,964 | 1/1989 | Connell et al. | 350/6.8 |
| 4,989,019 | 1/1991 | Loce et al. | 346/108 |
| 5,006,705 | 4/1991 | Saito et al. | 347/235 |
| 5,229,760 | 7/1993 | Curry | 345/20 |
| 5,241,329 | 8/1993 | Guerin | 347/233 |
| 5,305,022 | 4/1994 | Ota et al. | 347/234 |
| 5,398,052 | 3/1995 | Isaka et al. | 347/233 |

Primary Examiner—Benjamin R. Fuller
Assistant Examiner—Thinh Nguyen
Attorney, Agent, or Firm—Tallam I. Nguti

[57] ABSTRACT

A method and apparatus for producing within an imaging area of a charged surface and without significant banding, an array of pixel spots forming image scan lines including a start-of-image scan line. The method and apparatus include a ROS for generating an even number of light beams. The ROS includes a rotating polygon assembly having a plural number of facets 'F' for each deflecting the even number of light beams onto the imaging area of the charged surface forming scanning beams for simultaneously each producing an image scan line. The method and apparatus also include a controller for controlling the even number of light beams so that a scanning beam spacing "d" is maintained where "d" is equal to 'F'−1, and so that at start-of-producing the pixel spots forming the image scan lines, the beams are offset relative to the start-of-image scan line and only one-half the even number of light beams is deflected onto the imaging area of the charged surface to each form an image scan line.

18 Claims, 7 Drawing Sheets

INVENTION, TRAIL-BEAM-FIRST

| BEAM SEPARATION [# OF LINES] | INTERLACE ORDER | T [DEGREES] | BANDING COS(T/2) | SUPPRESSION 1-COS(T/2) % |
|---|---|---|---|---|
| 1 | 0 | 22.5 | 0.981 | 1.90% |
| 3 | 1 | 67.5 | 0.831 | 16.90% |
| 5 | 2 | 112.5 | 0.556 | 44.40% |
| 7 | 3 | 157.5 | 0.195 | 80.50% |
| 9 | 4 | 202.5 | -0.195 | 80.50% |
| 11 | 5 | 247.5 | -0.556 | 44.40% |
| 13 | 6 | 292.5 | -0.831 | 16.90% |
| 15 | 7 | 337.5 | -0.981 | 1.90% |

*FIG. 4*

| RUN # | LINE SCREEN [#ON:#OFF] | OFFSET [0 LINE] | | | | OFFSET [1 LINE] | | | |
|---|---|---|---|---|---|---|---|---|---|
| | | Xmax [um] | Xo-p [um] | dV/V [%] | sV/V [%] | Xmax [um] | Xo-p [um] | dV/V [%] | sV/V [%] |
| 1 | 1:0 | 1 | 0.831 | 0.766 | 2.69 | 1 | 0.831 | 0.766 | 2.69 |
| 2 | 1:1 | 1 | 1 | 0.904 | 0.906 | 1 | 1 | 0.904 | 0.906 |
| 3 | 1:2 | 1 | 0.831 | 0.727 | 1.03 | 1 | 0.831 | 0.727 | 1.03 |
| 4 | 2:1 | 0.854 | 0.815 | 0.713 | 0.730 | 0.854 | 0.815 | 0.713 | 0.730 |
| 5 | 1:3 | 0.707 | 1 | 0.835 | 0.838 | 1 | 1 | 0.835 | 0.838 |
| 6 | 2:2 | 0.854 | 0.924 | 0.772 | 0.775 | 0.500 | 0.707 | 0.591 | 0.593 |
| 7 | 3:1 | 0.854 | 0.924 | 0.772 | 0.775 | 0.854 | 0.924 | 0.772 | 0.775 |
| 8 | 1:4 | 1 | 0.831 | 0.653 | 0.721 | 1 | 0.831 | 0.653 | 0.721 |
| 9 | 2:3 | 0.854 | 0.815 | 0.641 | 0.648 | 0.854 | 0.815 | 0.641 | 0.648 |
| 10 | 3:2 | 0.854 | 0.768 | 0.604 | 0.666 | 0.854 | 0.768 | 0.604 | 0.666 |
| 11 | 4:1 | 1 | 0.691 | 0.543 | 0.571 | 1 | 0.691 | 0.543 | 0.571 |
| 12 | 1:5 | 1 | 1 | 0.727 | 0.733 | 1 | 1 | 0.727 | 0.733 |
| 13 | 2:4 | 0.854 | 0.924 | 0.672 | 0.677 | 0.707 | 0.707 | 0.514 | 0.518 |
| 14 | 3:3 | 0.854 | 0.924 | 0.672 | 0.677 | 0.854 | 0.924 | 0.672 | 0.677 |
| 15 | 4:2 | 1 | 1 | 0.727 | 0.733 | 0.354 | 0.383 | 0.278 | 0.281 |
| 16 | 5:1 | 0.707 | 0.707 | 0.514 | 0.518 | 0.707 | 0.707 | 0.514 | 0.518 |
| 17 | 1:6 | 1 | 0.831 | 0.550 | 0.560 | 1 | 0.831 | 0.550 | 0.560 |
| 18 | 2:5 | 0.854 | 0.815 | 0.540 | 0.544 | 0.854 | 0.815 | 0.540 | 0.544 |
| 19 | 3:4 | 0.854 | 0.768 | 0.508 | 0.517 | 0.854 | 0.768 | 0.508 | 0.517 |
| 20 | 4:3 | 1 | 0.691 | 0.458 | 0.463 | 1 | 0.691 | 0.458 | 0.463 |
| 21 | 5:2 | 0.707 | 0.588 | 0.389 | 0.396 | 0.707 | 0.588 | 0.389 | 0.396 |
| 22 | 6:1 | 0.854 | 0.462 | 0.306 | 0.314 | 0.854 | 0.462 | 0.306 | 0.314 |

*FIG. 7*

SCANNING METHOD AND APPARATUS FOR BANDING SUPPRESSION

BACKGROUND OF THE INVENTION

This invention relates to laser printing systems that utilize a high speed multi-beam raster output scanner (ROS) and, more particularly, to a scanning method and apparatus that extensively suppress an undesirable ROS wobble effect, or banding.

Electrostatographic printers are known in which a raster output scanner (ROS) produces laser image scan lines onto a charged photoreceptor or photoconductive surface, thereby forming a latent image on such surface. As is also known, the ROS can produce a single laser beam, or multiple laser beams, each of which can be modulated, for example, by being switched "on" and "off" according to electronic image data associated with a desired image to be printed. The modulated laser beams print a latent form of such a desired image on the charged photoreceptor, by moving, or scanning, over the charged photoreceptor in a fast scanning direction, while the photoreceptor moves oppositely to a slow scan direction, at right angles to the fast scan direction. During such scanning motion, (when the printer for example is operating in a discharged area development mode), some areas of the charged photoreceptor or surface are selectively imagewise discharged by the scanning laser beam (when in an "on" state), and other areas are not discharged by the beam (when in an "off" state), thereby forming a desired latent image on the photoreceptor. Modulation of the scanning beam is typically achieved by digitally controlling the output of a high speed laser diode or a modulator associated with a continuous laser source.

A rotating optical polygon with reflecting surfaces or facets is commonly used for deflecting the modulated laser beam to form a scanline on the charged photoreceptor surface. Reflection of the modulated laser beam by a facet of the polygon creates the scanning motion of the beam in the fast scan direction. The reflected beam normally is optically focussed in order to form a sharp scan line over the photoreceptor.

Examples of multiple beam scanning systems that include a ROS as discussed above, are disclosed in the following references. U.S. Pat. No. 4,637,679 for example discloses a multi-beam scanning system utilizing two semi-conductor laser sources that have a particular arrangement. Their output beams are formed into parallel light flux which are polarized perpendicularly to each other. Each beam is independently modulated by signals of the scanning line of an odd number and an even number, respectively, and it then becomes possible to write information simultaneously as multiple scanning lines.

U.S. Pat. No. 4,796,964 discloses a monolithic two beam laser emitter in which the beams from the two emitters are collimated and then directed by a rotating polygon mirror assembly to form multiple scan lines on a photosensitive drum. The invention therein is directed to an operational sequence intended to solve the problem of optical interference between the emitter outputs by controlling the ON-OFF state of each emitter. U.S. Pat. No. 4,547,038 also discloses a multi-emitter semi-conductor laser unit. The invention claimed therein is directed towards the optical system required to collimate and spatially separate the light beam outputs.

A specific problem associated with such multi-beam printing systems is the problem of a "banding" appearance in the output toner image. "Banding" is the appearance of horizontal or vertical stripes of lighter or darker density areas in the output toner image. Usually such stripes traverse the full width or full length of the toner image formed in the photoreceptor image plane. "Banding" as such is a problem particularly with scanning systems which involve repeated or periodic use of the beams to scan a number of lines much greater than the number of beams. As such, banding in the output print can occur in halftone or solid area (background or gray) images, but it is particularly a severe problem in high frequency halftone image printing.

Of interest to the present invention is the horizontal banding component of the "banding" problem. Horizontal bands, that is, bands extending in the fast scan direction, and hence transversely to the direction in which the photoreceptor is moved, are usually due to drive irregularities such as gear and axis errors or vibration of any of the optical components (mirror, lenses), or vibration of the image medium (e.g., the photoreceptor drum), or wobble in the scanning polygon mirror assembly. These vibrational phenomena cause the scan lines to have a periodic spacing error, and it is this error that results in the horizontal bands on the final print. The extensive suppression of the banding effects of ROS wobble, that is, wobble in the scanning polygon mirror assembly or in other components of the ROS, is particularly addressed by the method of the present invention.

As disclosed in commonly assigned patent U.S. Pat. No. 4,989,019 issued Jan. 29, 1991 and herein wholly incorporated by reference printing by interlace scanning using a dual beam ROS can suppress, to some degree, the appearance of banding due to wobble when the interlace order, and hence the spacing factor k between the two beams, is increased. As disclosed, $k=(1+2m)/(2f_xD)$ in which m is an integer, fx is the vibration spatial frequency, D is the nominal raster spacing, and k is chosen to the nearest odd integer.

It is apparent that use of such an equation is complicated. Besides, it has been found that greater or relatively more banding suppression can be achieved by using a relatively straight forward and less complicated method and apparatus according to the present invention.

SUMMARY OF THE INVENTION

In accordance with one aspect of the present invention, there is provided a raster output scanning (ROS) apparatus for forming within an imaging area of a charged surface, and without a significant banding effect from wobble of the ROS, an array of image scan lines including a start-of-image scan line, and an end-of-image scan line that is spaced in a slow scan direction from the start-of-image scan line. The ROS apparatus includes a light source for generating two laser beams, and a rotatable polygon assembly for deflecting the two laser beams to create two corresponding scanning beams for simultaneously forming two image scan lines. The two corresponding scanning beams as created include a first scanning beam, and a second scanning beam spaced in the slow scan direction from the first scanning beam. The ROS apparatus also includes a controller for controlling the laser beams and the rotatable polygon assembly so as to initiate the forming of the array of image scan lines by offsetting the laser beams relative to the start-of-image scan line so as to create only a single image scan line, on a first pass of the ROS apparatus, within the imaging area of the charged surface.

Pursuant to another aspect of the present invention, there is provided a raster output scanning (ROS) apparatus for forming within an imaging area of a charged surface, and without a significant banding effect from wobble of the ROS, an array of image scan lines including a start-of-image scan line, and an end-of-image scan line that is spaced in a slow scan direction from the start-of-image scan line. The ROS apparatus includes a light source for generating two laser beams, and a rotatable polygon assembly having a number of facets 'F' for deflecting the two laser beams so as to create two corresponding scanning beams which are spaced from one another by a beam separation distance "d" equal to 'F'−1 lines.

Pursuant to a further aspect of the present invention, there is provided a reduced banding method of producing within an imaging area of a charged surface, an array of pixel spots forming image scan lines including a start-of-image scan line, and an end-of-image scan line that is spaced in a slow scan direction from the start-of-image scan line. The method includes the step of generating two light beams for creating two scanning beams including a first scanning beam, and a second scanning beam spaced in the slow scan direction from the first scanning beam. The method importantly includes a step of offsetting the beams relative to the imaging area and initially creating only one scanning beam to produce pixel spots forming one image scan line on a first scanning pass within the imaging area. The method then includes the steps of moving the imaging area of the charged surface a desired distance relative to the created first scanning beam, the step of next creating at most the two first and second scanning beams to produce pixel spots forming at most two additional image scan lines on the next scanning pass within the imaging area, and lastly the step of repeating the moving step and the next creating step, until creating a scanning beam to produce the end-of-image scan line.

Other features of the present invention will become apparent from the following drawings and description.

BRIEF DESCRIPTION OF THE DRAWINGS

FIG. 4 is a table of beam separations and related degrees of banding suppression for a dual beam, 8 faceted polygon ROS apparatus according to one aspect of the present invention;

FIG. 7 is a table of several values from halftone screens of various sizes showing pixel spot placement errors (Xo-p) for conventional lead-beam-first, zero line-offset, beam sequencing, and for a one line-offset trail-beam-first, beam sequencing method according to the present invention;

DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
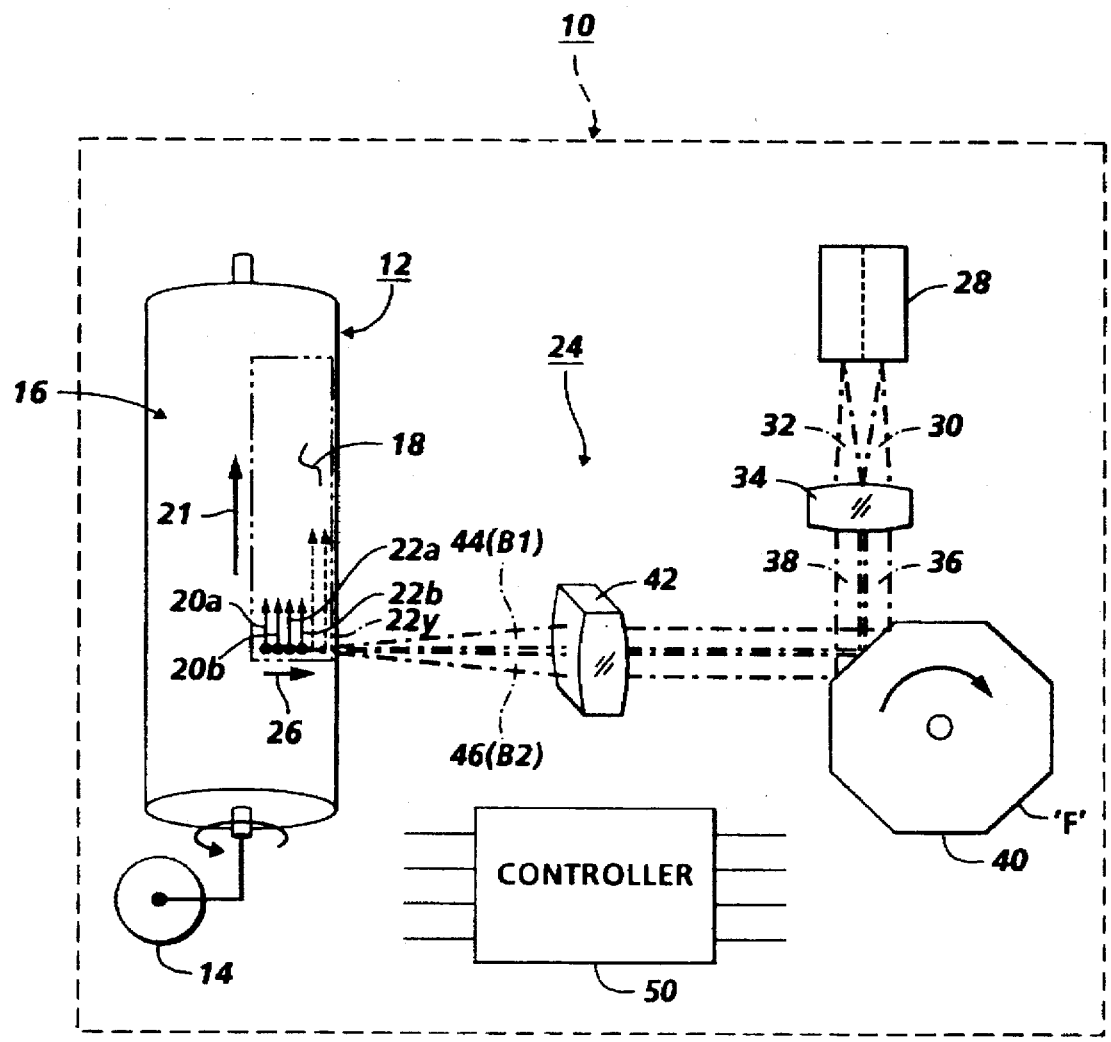
FIG. 1 is a perspective schematic view of part of a laser printing machine including a multi-beam ROS apparatus and controller according to the present invention.

Referring now to FIG. 1, there is shown part of a laser printing machine 10 including an image bearing member such as a photoconductive drum 12. The machine 10 also includes a motor 14 for driving the photoconductive drum 12. Photoconductive drum 12 has a charged surface 16 that includes an imaging area shown as 18 within which an array of pixel spots is producible to form image scan lines 20a 22a, 20b, 22b etc. and 22y. The pixel spots are produced or written by a multi-beam ROS apparatus 24 according to the present invention. As shown, the image scan lines 20a, 22a, 20b, 22b etc. and 22y include a start-of-image scan line 20a and an end-of-image scan line 22y that each extend in a fast scan direction shown by the arrow 21, and that are spaced from one another in a slow scan direction shown by the arrow 26.

The dual beam ROS apparatus 24 includes at least one laser source 28 for emitting at least two output light beams 30, 32 from which scanning beams are created. To create the scanning beams, the light beams 30, 32 are first collimated by collimator lens 34 to form collimated beams 36, 38. Beams 36, 38 are then deflected and directed by a facet Fi of a multi-faceted rotating polygon mirror assembly (rotating polygon) 40, having a number of facets 'F', to an fθ lens 42 for imaging and correction of distortion. For imaging, lens 42 focuses the beams 36, 38 as scanning beams B1, B2 or 44, 46 or (B1, B2 FIG. 2) onto the surface 16 of drum 12 in order to produce or write pixels or pixel spots for forming the image scan lines 20a, 22a, 20b, 22b etc. and 22y. Laser source 28 can, for example, be a monolithic high density array as is well known, having independently addressable emitters.

For controlling rotating polygon assembly 40, as well as the emitters of the laser source 28, the ROS apparatus 24 includes a controller 50 that is adapted meaning that the controller is programmable, as is well known in the art for also controlling various aspects and operations of elements of the ROS apparatus 24. Controllable aspects of the ROS apparatus 24, for example, may include beam state, i.e., modulation of a beam determining whether a beam is "on" or "off", beam spacing, as well as beam writing sequence, i.e., determining which beam initially scans ahead of which beam. The controller 50, as is well known, may also be connected to other elements of the printing machine, for example, to the motor 14, so as to control movement of the drum 12, and hence the movement of the imaging area 18 thereon. Accordingly, beam spacing, for example, may be controlled for various reasons including achieving interlace or non-interlace writing of image scan lines. Beam spacing can also be controlled for optimizing banding or wobble effect suppression as according to the present invention.

As such, beam spacing can be controlled in order to carryout interlace writing at various orders of interlace, including an optimum order of interlace for any given ROS apparatus determined in a manner according to the present invention. Additionally, the state and writing sequence of the beams can also be controlled in order to produce reduced banding in halftone pattern printing according to the present invention.

Setting or controlling beam spacing in general was shown in U.S. Pat. No. 4,989,019 (incorporated above by reference), to partially reduce banding. Specifically, it was disclosed therein that banding due to periodic errors initially decreases as interlace order or beam spacing is increased. This is because by increasing the beam spacing or interlace order, the periodic errors appearing as bands, are distributed over a larger area. It is known, for example, that banding with a frequency of about 1 cycle/mm is most noticeable to the human eye. The order of interlacing or beam spacing should, therefore, be chosen so as to minimize the regularity that might cause perception of banding in the printing.

ROS wobble however is inevitable in high speed and high resolution ROS printing machines. In printed halftone images, for example, the effects of ROS wobble show up as distinct periodic bands. This in general is because in such high speed ROS machines, absolute balance of the ROS rotor is very important and difficult to achieve. A slight imbalance of the rotor will cause the laser beam to "wobble", typically once per revolution. Such laser beam or ROS wobble also depends in part on the dynamic stiffness of the air bearing, as well as on the effective damping of the optics and motor polygon assembly (MPA) system of the ROS. As disclosed in U.S. Pat. No. 4,989,019, (incorporated above by reference), part or a portion of the banding or effect of such ROS wobble can generally be suppressed by interlace writing or scanning using a multi-beam, for example, a 2 beam system.

In U.S. Pat. No. 4,989,019, it was disclosed that banding as such is attenuated according to the cosine of the product of the frequency of vibration, fx, and by the interlaced spacing factor k. Optimum spacings were, therefore, identified for suppressing either known frequencies that are present in the scan system (for example, a wobble frequency in the polygon mirror assembly) or for suppressing frequencies to which the eye is sensitive (e.g., 1 cycle/mm). As disclosed therein, $$k=(1+2m)/(2f_xD) \quad (1)$$

in which m is an integer, fx is the vibration spatial frequency, D is the nominal raster spacing, and k is chosen to the nearest odd integer.

As an example in the above patent, a 600 spi system with polygon wobble occurring at $f_x=1$ cy/mm was considered. The interlace separation values, found to minimize the banding in the considered system were:

k=11, 13, 35, 37, 59, 61, etc.

Even values of k were not used since the raster lines would not interlace properly.

The complexity of the above formula for calculating values of k is obvious. The large values for k make the proposed approach apparently cumbersome and relatively unsatisfactory. In addition, it has been found that image scan lines produced conventionally using only interlace scanning, apparently do not exhibit enough suppression or attenuation of such banding or wobble effect. In fact, as shown in the table of FIG. 4, the proposed interlace scanning approach, given beam separations of 11 or 13 as above, is able to reduce or suppress only about 17%–44% of the banding effect of any wobble error present (see the column 1–Cos (T/2) for beam separations of greater than 7 lines or pixels. Therefore significant banding is still present, and shows up particularly as a defect in printed half-tone images. Further suppression of such remaining significant banding is therefore desirable.

According to the present invention, it has been found that such remaining significant banding can be further suppressed, (a) by a simple approach to controlling the interbeam spacing in a given ROS system, and (b) by controlling a "beam offset" and the beam printing sequence particularly in a two beam multibeam ROS system, such that at the start of scanning, only one beam is used in the first pass to scan one image scan line. In doing so, the total banding effect can be suppressed about 80%–81%, which means that the additional remaining significant banding or wobble effect suppressed can range from 22% to as high as 62% over conventional banding suppression at 17%–44% using only an interlace-scanning approach.

Figure 2:
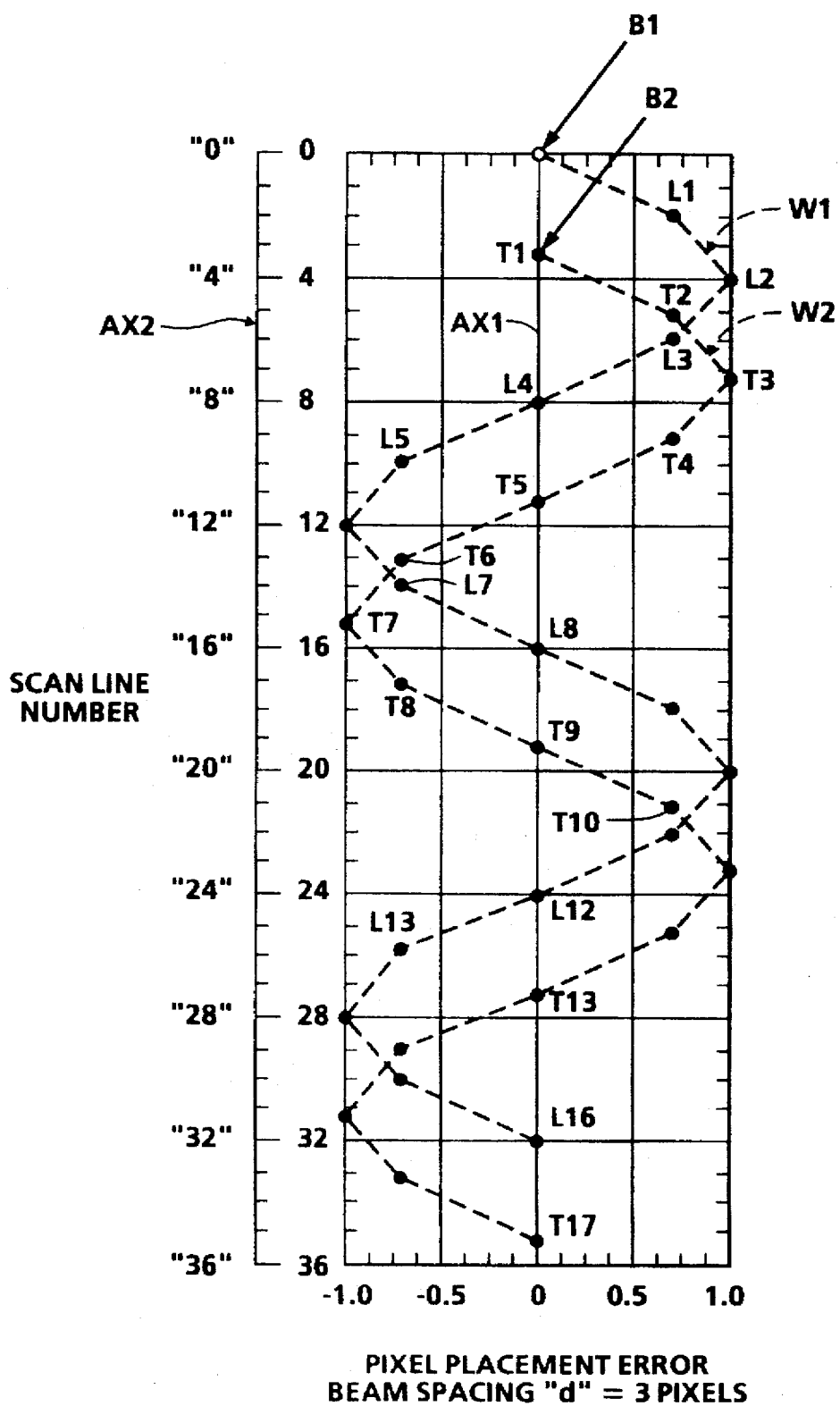
FIG. 2 is a sinusoidal plot of pixel spot placements of the first pixel spot of each image scan line number, using the beam sequencing method of the present invention with a first order interlace dual beam ROS, incorporating a suppressible built-in 1 micron placement error.

According to the present invention, the simple approach of controlling the interbeam spacing beam offset, and of beam sequencing so as to further suppress banding can be demonstrated as illustrated, for example, in FIG. 2. FIG. 2, for example, shows a one dimensional (first pixel spot only) line map of a pair of interlacing scanning beams B1, B2 which have built-in a maximum 1 micron wobble error of the ROS. The order of interlace is equal to 1, that means, the two beams B1, B2 are spaced apart a distance "d" of 3 pixels or 3 lines. For a second order interlace, the beams will be spaced 5 pixels or 5 lines apart. A zero order interlace in which the beams are adjacent with only 1 pixel spot spacing therebetween, or other higher order interlace is possible. The only restriction is that the beam separation distance "d" must be an odd number of pixels or lines. As shown, the wobble error signature is sinusoidal, and has an amplitude of 1 micron for each beam. Because the beam separation as such between the 2 beams B1, B2 is ordinarily constant, the wobble amplitude will be the same for each of the beams.

Still referring to FIG. 2, pixel spots Li, where i=1, 2, 3 . . . 16 are produced by lead beam B1 on passes 1, 2, 3 . . . 17. Pixel spots Ti, where i=1, 2, 3 . . . 17 are similarly produced by trail beam B2 on passes 1, 2, 3 . . . 17. Pixel spot positions "0", "4", "8", . . . "28", "32" and "36" are shown along vertical axes AX1, AX2 which are shown extending in a direction corresponding to the slow scan direction. Each numbered position as such represents an ideal distance for the numbered pixel measured from the top of the imaging area at pixel spot "0". For example, for a 600 spi ROS apparatus, the pixel to pixel or line to line distance along the vertical axis AX1 is about 42.3 microns. Note however that because of the cosine nature of the placement errors, the actual distance of a particular numbered pixel spot from the top of the imaging area at pixel spot "0", is equal to the ideal distance along the axis AX1, plus any horizontal distance from the axis AX1 to the actual error position of the particular pixel spot. For example, the actual distance of pixel spot "7" (shown as T3 to indicate that it was placed down by the trail beam B2 on its third pass), has an actual distance from the scan line pixel spot "3" (shown as T1) of (4×42.3+1) microns.

In accordance with the present invention, the printing of scan lines represented by the numbered pixel spots of FIG. 2 will proceed with the lead and trail beams B1, B2 respectively offset such that pixel spot "3" (in this case the second image scan line within the imaging area 18 (FIG. 1)) is spatially aligned with the trail beam B2, and is chronologically written first within the imaging area, on the initial pass, as T1 by the trail beam B2. In general, the numbered pixel spot that is initially aligned to, and written first by, the trail beam depends on the beam-to-beam spacing or interlace order. However, in this first order interlace example, during such first pass, the lead beam B1 is aligned to pixel spot "0" and is modulated or turned, "off", and the trail beam B2 is "on" and aligned to pixel "3".

As shown, pixel spots "0" and "1" actually lie outside the imaging area, such as area 18 (FIG. 1). They therefore do not really exist, and do not need to be placed down or written, because of the initial offset of lead beam B1 relative to the start-of-image scan line within the imaging area. Pixel spots "0" and "1", however, are shown here only for illustrative purposes, and represent the magnitude of the "beam offset" of the lead beam B1 during the initial and first scanning pass of the ROS apparatus within the imaging area. On the second pass within the imaging area, pixel spots "2" and "5" (spaced 3 pixels apart) are aligned to the lead and trail beams conventionally and respectively, and are written simultaneously, followed by pixels "4" and "7" on the next pass, and so on, until an end-of-image scan line, such as scan line 22y (FIG. 1) is written.

As such, consecutive image scan lines 20a 22a, 20b, 22b etc. and 22y, etc., (FIG. 1) can be written on the drum surface 16 in an interlacing manner, rather than in a consecutive scanning manner. In other words, non-adjacent scan lines represented by first pixel spots ("2", "5") for example, are written simultaneously. For the system shown in FIG. 1, the number of lines that the drum 12 has to advance between each scanning pass is equal to the number of beams in the system, which of course may be greater than the two beams shown. For such interlace scanning or writing, the second, or trailing beam B2 will always be positioned at a line that is spaced "d" number of lines or pixel spots relative to the line on which the lead beam B1 is positioned.

Figure 3:
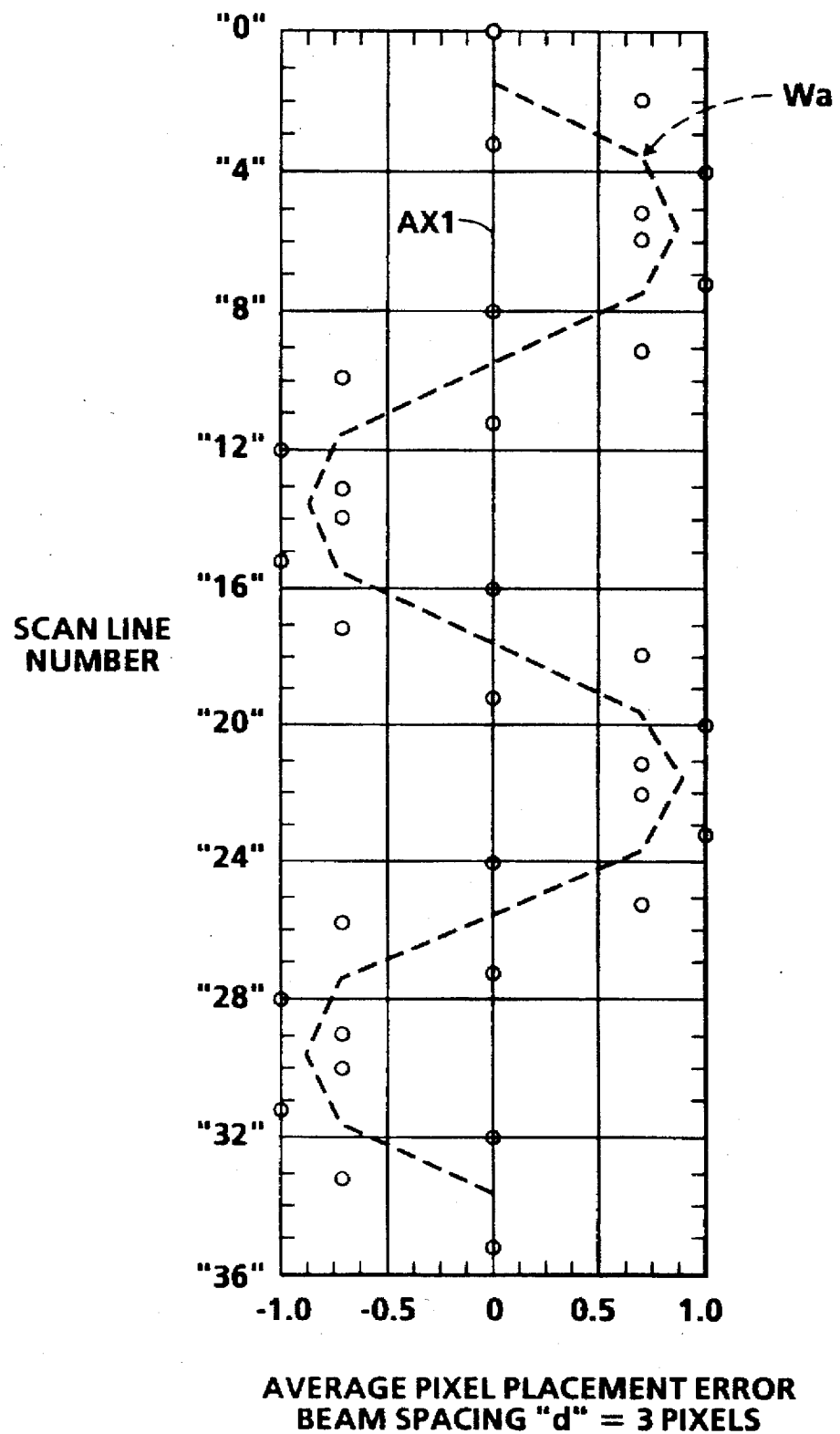
FIG. 3 is an illustration of a single wave resulting from a visual integration of the two waves of FIG. 2.

As is well known, a repeated pattern of consecutive pixel spots scanned or written alternatively by the trail and lead beams B1, B2 are ordinarily combined within the imaging area, as well as visually by the human eye (when developed), in order to form recognizable characters. Because such a combination of consecutive pixel spots written by the trail and lead beams B1, B2 is required to form printed characters, the 2 waves W1, W2 of FIG. 2 are therefore in effect being visually integrated by the human eye when viewing printed materials. Such visual integration in effect results in a single average wave Wa as shown in FIG. 3. The integrated wave Wa as illustrated has the same frequency but a slightly lower pixel placement error amplitude. The slight lowering of the amplitude of the pixel placement error as such represents some degree of attenuation or suppression of the wobble effect. The phenomenon resulting in such wobble effect attenuation in the wave Wa can be analyzed mathematically simply by averaging the pixel spot placement positions between the 2 beams B1, B2.

Where the position of a pixel spot placed by the lead beam B1 on the lead wave W1 is denoted X1, and the position of a pixel spot placed by the trail beam B2 on the trail wave W2 is denoted X2, the position Xa of the visually integrated wave Wa is therefore simply the average of the two positions X1 and X2. The position Xa as such can thus be expressed as:

$$Xa=(X1+X2)/2 \text{ or}$$

$$Xa=[\text{Sin}(Q)+\text{Sin}(Q-T)]/2$$

where:

Xa is the position of a pixel on the average wave Wa;

Q is the angular position of the particular pixel; and

T is the delay in degrees between the 2 beams B1, B2 due to the beam-to-beam separation.

In general, $$T= \text{``}d\text{''} \times (360 \text{ degrees})/(\text{`}N\text{'} \times \text{`}F\text{'})$$

where:

"d" is the beam separation in pixels or scan lines

'N' is the number of beams; and

'F' is the number of facets of the polygon mirror.

For example, where the beam separation "d" is 3 pixels or scan lines;
'N' is 2;

and 'F' is 8,

T=3 pixels×(360 degrees)/(2 pixels×8 facets)=67.5 degrees.

Alternatively, Xa can be expressed as follows:

$$Xa=[\text{Sin}(Q+T/2)+\text{Sin}(Q-T/2)]/2$$

where Xa, Q and T are as defined above above.
Using a "Sine of 2 angle identity", expression, this can be simplified to:

$$\begin{aligned} Xa &= \text{Cos}(T/2)\text{Sin}(Q) \\ &= \text{Cos}(67.5/2)\text{Sin}(Q) \\ &= 0.831 \text{ Sin}(Q) \end{aligned}$$

where:

Cos (T/2) is the wobble resolvable factor, that is, the degree of unresolved banding or wobble effect. The degree of actual wobble effect or banding suppression or attenuation is therefore given by:

$$1-\text{Cos }(T/2).$$

FIG. 4 for example gives the results of effective amounts of wobble effect attenuation or suppression as a function of beam separation in an 8 faceted polygon mirror assembly with a built-in maximum (100%) wobble error of 1 micron for a 2 beam system. Note that the Cos (T/2) values are each the degree of unresolved or remaining banding or wobble effect, and that the 1−Cos (T/2) values are each the degree of banding or wobble effect actually suppressed or attenuated at the given beam separation or interlace order.

As shown, a beam separation of 1 pixel spot means that pixel spots or scan lines are written back to back with no interlace. It is quite clear from the results that an optimum beam separation of 7 pixel spots, which for an 8 faceted polygon is equal to 'F'−1, produces the greatest degree of banding or wobble effect suppression (1−Cos(T/2)) at 80.5% of the built-in 100%. Notice further however that for the 8 faceted polygon system, beam separations of greater than 'F'−1 do not improve on the 80.5% attenuation. Instead, the degree of attenuation merely cycles back and forth according to the cosine function. Therefore, in accordance with one aspect of the present invention, for extended banding suppression, the beam separation distance "d" should be controlled so as to be equal to 'F'−1 pixel spots or scan lines, where beam has a scanning width of 1 pixel spot, and 'F' is the number of facets of the rotatable polygon mirror of the ROS apparatus.

According to another aspect of the present invention, extended or even greater wobble effect suppression is also possible through a method involving a particular lead and trail beam sequencing and "beam-offset" scanning approach. This method is believed to be useful in continuous-tone image ROS scanned printing, and in half-tone image ROS scanned printing. This method is particularly effective when the halftone image to be scanned and printed consists of a repeated pattern, (extending in the slow scan direction), of an even number of pixels or pixel spots 'XX' that are "on" (meaning, scanned and printed), and an even number of pixels or pixel spots 'YY' that are "off."

Figure 5:
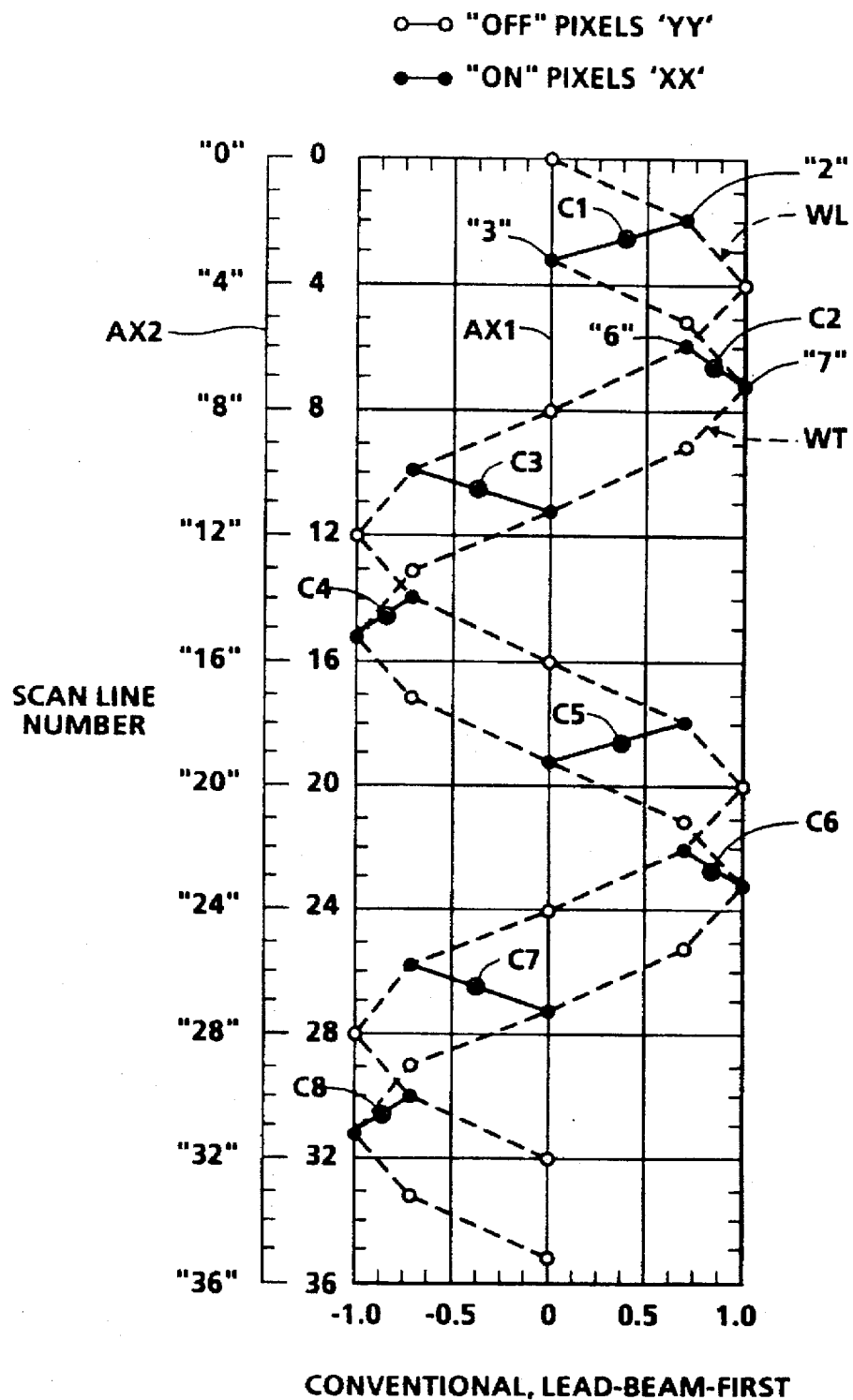
FIG. 5 is a plot of pixel spot placements of the first pixel spot of each line of a series of numbered 2 "on" 2 "off" halftone image scan lines, using a conventional (lead-beam-first) beam sequencing of a first order interlace dual beam ROS apparatus, with a suppressible built-in 1 micron placement error.

The particular effectiveness of the method will be discussed with reference to FIGS. 5, 6 and 7. FIG. 5 is a plot of pixel spot placements of the first pixel spot of each line of a series of halftone image scan lines of a basic 2 "on" 2 "off" halftone image pattern. The pixel spot placements here were carried out using a conventional (lead-beam-first) beam sequencing of a first interlace order (which means that the beams are immediately adjacent, and are only one scan line apart) in a dual beam ROS apparatus, with a suppressible built-in 1 micron maximum placement error. In order to illustrate the isolated impact of this method, other banding suppression techniques such as interlace scanning, and beam separation control, are not incorporated. In this conventional approach, as shown, there is no beam offset, and the two beams such as B1, B2 (FIG. 2) are sequenced such that on the initial pass, the lead and trail beams B1, B2, respectively, simultaneously scan a first pair of "on" or 'XX' scan lines represented by pixels "2" and "3." In doing so, pixel "2" is scanned by the lead beam B1, and pixel "3" is scanned by the trail beam B2.

As discussed above, the repeated pattern of consecutive "on" or 'XX' pixel spots scanned or written alternatively by the trail and lead beams of a dual beam ROS, for example, beams B1, B2, are ordinarily combined on the imaging area, as well as, visually by the human eye (when developed), to form recognizable characters. As a result, the 2 waves WL, WT of FIG. 5 can be viewed as forming an integrated average wave (not shown) whose path lies through centroid points C1, C2, ... C8 for the illustrated groups of "on" pixels 'XX' as written conventionally. Note that in FIG. 5 the first centroid C1 lies somewhere between the "2" and "3" pixel positions, and closer to position "2", a backward leaning tendency when considered relative to the slow scan or line spacing direction. The effect of this tendency therefore is to reduce the apparent separation, and hence the apparent delay "T" between the two beams. As discussed above, "T" in general is given by:

$$T = \text{``}d\text{''} \times (360 \text{ degrees}) / (\text{`}N\text{'} \times \text{`}F\text{'})$$

where:

"d" is the beam separation (apparent in this case) in pixels;

'N' is the number of beams; and

'F' is the number of facets of the polygon mirror.

Given such a tendency, and assuming, for example, that we are dealing with a ROS having an intended "3" pixel beam-to-beam separation, then the apparent effect as here would be to reduce such separation from a non-optimum "3" pixels to "2" pixels. "T" in an 8-faceted polygon ROS (given a conventional beam sequencing approach) will therefore be:

T=2 pixels×(360 degrees)/(2 pixels×8 facets)=45 degrees, (as opposed to 67.5 degrees for the actual "3" pixel separation). As a result, the degree of banding suppression given by 1−Cos(T/2) (as above) will be 1−Cos(45/2), instead of 1−Cos(67.5/2). This will be equal to 1−0.924 or 7.6%, instead of the 16.9% (see FIG. 4). This result of course only illustrates the isolated impact of the beam sequencing approach, and does not reflect additional banding suppression obtainable due to other banding suppression techniques such as interlace scanning, and beam separation control.

Figure 6:
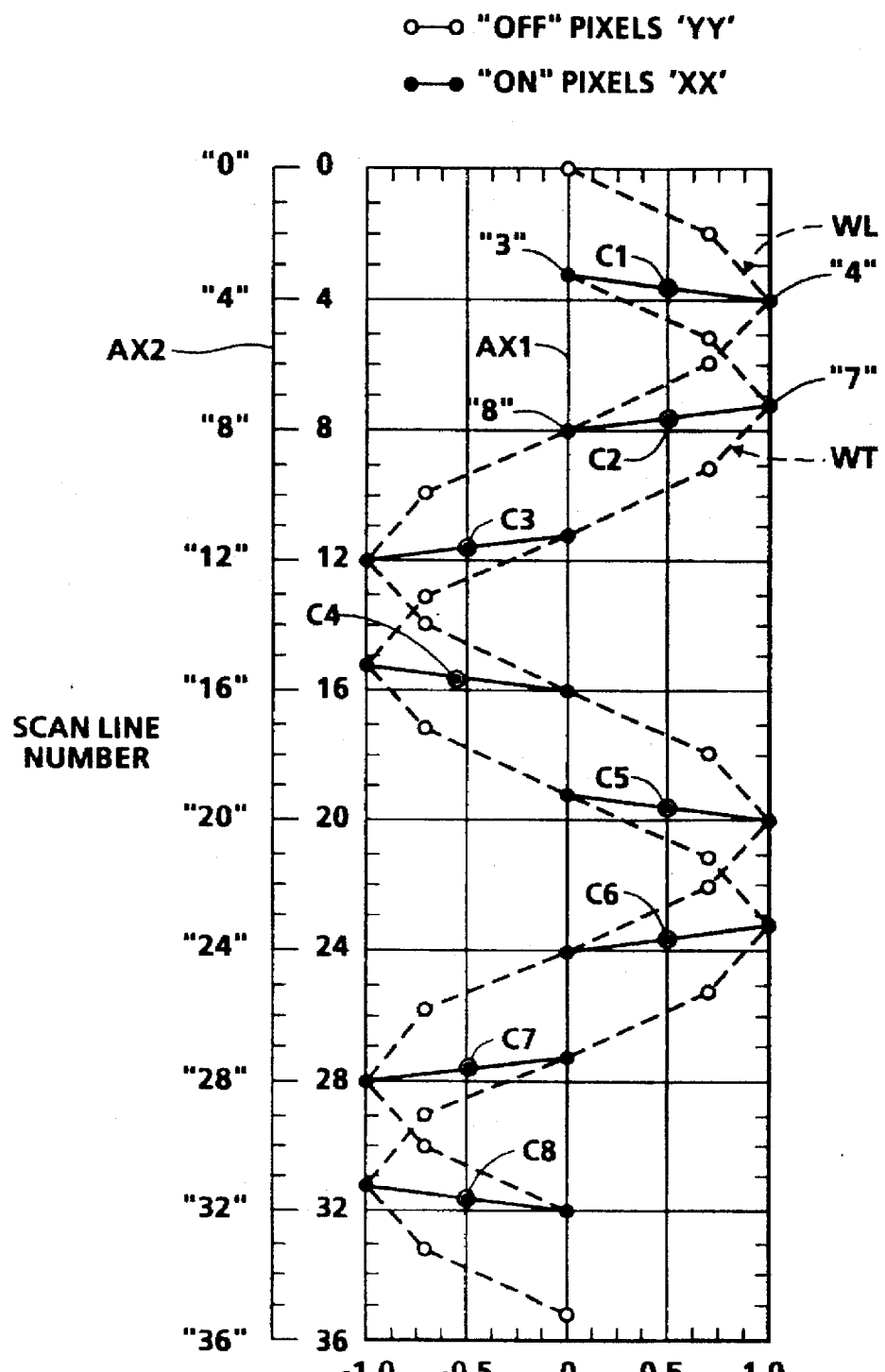
FIG. 6 is a plot of the pixel spot placements of the first pixel spot of each line of the series of numbered 2 "on" 2 "off" halftone image scan lines of FIG. 5, using the (trail-beam-first) "beam offset" sequencing approach of the present invention in a first order interlace of the dual beam ROS apparatus of the present invention, with a suppressible built-in 1 micron placement error.

On the other hand, in accordance to the present invention, FIG. 6 is a plot of the pixel spot placements of the first pixel spot of each line of the series of halftone image scan lines of FIG. 5, using the (trail-beam-first) "beam offset" sequencing approach of the present invention. The order of interlace is the same, and the suppressible built-in placement error is also 1 micron maximum. Again, in order to illustrate the isolated impact of this method, other banding suppression techniques such as interlace scanning, and beam separation control, are not incorporated.

In accordance with this "beam offset" method, there is a one pixel offset as shown in FIG. 6 so that pixel "2" is skipped, and is not the first pixel written as was the conventional case in FIG. 5 above. Instead, the two beams such as B1, B2 are offset and sequenced such that on the initial pass, the lead beam B1 is modulated or turned "off", and only the trail beam B2 is "on" and scans one line, represented by pixel "3", of the first pair of "on" or 'XX' scan lines. Due to the offset, the first pair of "on" beams 'XX' is represented this time by pixels "3" and "4", instead of "2" and "3" as was the case in the conventional approach above. The second of this pair of "on" pixels, pixel "4" is therefore scanned as shown by the lead beam B1 on the second pass. Because the halftone screen is 2 "on" 2 "off", the trail beam 132 is therefore turned off during this second pass. As can be understood, the trail beam 132 will not have to be turned "off", if the screen size was for example 4 "on" 4 "off" or larger.

Similarly, as discussed above, the repeated pattern of consecutive "on" or 'XX' pixel spots scanned or written alternatively by the trail and lead beams of a dual beam ROS, for example, beams B1, B2, are ordinarily combined on the imaging area, as well as, visually by the human eye (when developed), to form recognizable characters. As a result, the 2 waves WL, WT of FIG. 6 can also be viewed as forming an integrated average wave (not shown) whose path lies through centroid points C1, C2, ... C8 for the illustrated groups of "on" pixels as written according to the present invention. Note that in FIG. 6 the first centroid C1 lies somewhere between the "3" and "4" pixel positions, and closer to position "4", a forward leaning tendency relative to the slow scan direction. The effect of this tendency is therefore to increase the apparent separation, and hence the apparent delay "T" between the two beams. As discussed above, "T" in general is given by:

$$T = \text{``}d\text{''} \times (360 \text{ degrees}) / (\text{`}N\text{'} \times \text{`}F\text{'})$$

where:

"d" is the beam separation (apparent in this case) in pixels;

'N' is the number of beams; and

'F' is the number of facets of the polygon mirror.

Given such a tendency, and assuming, for example, that we are dealing with a ROS having an intended "3" pixel beam-to-beam separation, then the apparent effect as here would be to increase such separation from a non-optimum "3" pixels to "4" pixels. "T" in an 8-faceted polygon ROS will therefore be: T=4 pixels×(360 degrees)/(2 pixels×8 facets)=90 degrees, (as opposed to 67.5 degrees for the intended "3" pixel separation).

As a result, the degree of banding suppression given by 1–Cos(T/2) (as above) will be 1–Cos(90/2), instead of 1–Cos(67.5/2). This will be equal to 1–0.707 or 29.3%, instead of the 16.9% (see FIG. 4). Again, this result of course only illustrates the isolated impact of the beam sequencing approach of the present invention, and does not reflect additional banding suppression obtainable due to other banding suppression techniques such as interlace scanning, and beam separation control. However, note the significant improvement in the amount or degree of banding suppression obtainable with this "beam offset" and sequencing method (29.3%) as compared to the (7.6%) from the conventional method of FIG. 5. These results indicate about a 21.7% improvement in banding suppression when ROS scanned images are scanned with the trail beam first according to the present invention.

The same or similar analysis can also be carried out for 2 "on" 4 "off" and 4 "on" 2 "off" halftone screen sizes, as well as for all other even-number-of-pixels "on", even-number-of-pixels "off" cases. The results for such screen sizes from using a simulation program as shown for example in Appendix A of this specification, are shown in FIG. 7. The results of such extended or greater banding suppression simulation were then verified by actual printed halftone images. Good correlation was found between the results. The pixel placement model was developed in order to study the halftone banding or ROS wobble effect as interacted with beam interlacing, and with other imperfections. Halftone cells were constructed of individual "on"/"off" pixels. In a one dimensional analysis, such wobble effect or banding is simulated by the placement of line screens in the slow scan direction.

The model was coded using the Mathematica software, and the listing is included in Appendix A. Given the ROS attributes, the first step was to generate a one dimensional pixel map of the image as in FIG. 6. The second step was to construct linking lines between adjacent pairs of "on" scan lines, and to then calculate their centroids. Where the scan line is greater than one pixel wide, its centroid was determined by the positional average of the leading and trailing pixels. If there was a line growth differential between these two pixels, the centroid of the line was shifted proportionally toward the fatter pixel. Characteristics of those pixels sandwiched in between the leading and trailing pixels did not contribute to the calculations.

The centroids of the scan line pairs representing their positional placements were stored in an array for future analysis. The velocity map of the image was calculated by differentiation of the positional data using backward differences. Windowing was not used in order to prevent transform leakage. This was taken care of by exact periodicity of the data. Aliasing was also not a concern since the frequency contents were known.

Referring now to FIG. 7, a table of several values (obtained by simulation) is provided from halftone screens of various sizes, and shows pixel spot placement errors (Xo-p) for conventional lead-beam-first sequencing as in FIG. 5 with zero scan line-offset. It also shows comparative values for a one line-offset trail-beam-first sequencing method according to the present invention. In each case, the only motion error input to the model is the 1 micron zero-to-peak ROS wobble error. All in all, 22 different size screens were tested as shown in the first column. The second column gives the line screen size in the order of number of lines "on" and lines "off". The zero pixel offset group of columns gives parameter values for a conventional writing sequence in which the very first pixel "on" is written by the lead beam, such as B1 (FIG. 2), in a dual beam ROS. The one pixel offset group of columns gives comparative parameter values for the "beam offset" sequencing method of the present invention, in which the very first pixel is written by the trail beam, such as B2 (FIG. 2), in a dual beam ROS.

The 4 output parameters of each group of columns are:

XMAX is the time domain zero to peak digitized positional error.

X0-p is the frequency domain zero to peak wobble resolvable amplitude.

dV/V is the conventional MQ (motion quality) error of the ROS wobble.

sV/V or 1.4 sV/V, is a statistical MQ (motion quality) measure.

For a continuous signal with a single frequency (such as in this case), 3 of the above 4 parameters are related by the equation:

$$sV/V = dV/V = 6.2832 \, (fs) \, (X0\text{-}p)$$

where fs is the spatial frequency of the wobble and equals 1.476 c/mm.

Referring still to FIG. 7, the 1:0 line screen size (meaning, 1 line "on" and zero lines "off") when printed, should appear as a 100% solid black. Note that the simulation here gives the same result of 0.831 for the unresolved error Xo-p as was found in FIG. 4 under Cos(T/2) in the case of a first order interlace.

Additionally, as shown in FIG. 7, the values for the parameter Xo-p are unchanged between the no-offset conventional and the proposed one beam offset cases for any size screen that includes an odd number of pixels "on" or "off". It is believed that such even:odd, odd:even, and odd:odd "on" :"off" halftone screen size combinations are not affected by this phenomenon because when being written, the writing pattern changes back and forth, and can not be aligned to a generic pattern simply by a phase shift of either the lead or trail beam. On the other hand, significant reductions in Xo-p values between the two groups of columns are shown for even:even size screens, such as the 2:2, 2:4, and 4:2 screen sizes. Apparently, for the none even:even screen sizes, the writing sequence of the lead and trail beams alone does not make any difference in the wobble effect suppression results. However, it is believed that it is still beneficial to start or initiate the writing of scan lines on any size screen positional-wise with the trail beam writing first according to the "beam offset" and sequencing method of the present invention.

However, since a majority of halftone screens have a spatial period of an even number of pixels "on" and an even number of pixels "off", it would be advantageous to align and sequence the beams in halftone writing so that the trail beam writes first, as in accordance with the present invention. As has been shown, this is in order to further attenuate or suppress banding or the effect of ROS wobble, even when interlace writing. Note that it has been found that if the beam-to-beam separation between the 2 beams B1, B2, for example, is greater than 'F'–1 (i.e. greater than 7 pixels or scan lines in an 8-faceted ROS), the opposite is true, and, therefore, it would be advantageous instead to align and sequence the beams in halftone writing so that with the lead beam writes first on the initial pass.

Accordingly, this invention provides a raster output scanning (ROS) apparatus that is useful for producing, within an imaging area of a charged photoreceptor surface, and without a significant banding effect from wobble of the ROS apparatus, an array of image scan lines that include a start-of-image scan line, and an end-of-image scan line that is spaced in a slow scan direction from the start-of-image line. The ROS apparatus includes at least one light source generating two light beams. In general it is believed that the invention will work equally for another number of light beams 'N', provided 'N' is an even number.

The ROS apparatus also includes a rotatable polygon assembly for deflecting the two light beams in order to create two corresponding scanning beams for simultaneously producing two image scan lines within the imaging area. The two corresponding scanning beams include a first scanning beam such as B1 (FIG. 1), and a second scanning beam such as B2 (FIG. 1) that is spaced in the slow scan direction from the first scanning beam. The ROS apparatus further includes control means for controlling the light source and the rotatable polygon assembly so as to initiate producing the array of image scan lines by creating only one scanning beam of the two scanning beams for simultaneously producing, in a first pass, only one image scan line within the imaging area of the charged surface. In general therefore, the ROS apparatus will produce 'N' light beams for creating 'N' scanning beams, and the control means will control the light source and the rotatable polygon assembly so as to initiate producing the array of image scan lines by creating only a fraction 'n', equal to one-half, of the 'N' scanning beams for simultaneously producing, in a first pass, only 'n'×'N' image scan lines within the imaging area of the charged surface.

In another aspect, this invention provides a raster output scanning (ROS) apparatus for similarly producing, in several passes within an imaging area of a charged surface, and without a significant banding effect from wobble of the ROS apparatus, a periodic halftone pattern of an even number of "on" image scan lines 'XX', and even number of "off" image scan lines 'YY', including a start-of-image group of "on" image scan lines 'XX', and an end-of-image group of "on" image scan lines 'XX'. For this particular aspect, it is preferable that the fraction 'n'×'N' of image scan lines written or produced on the initial pass, be a number less than 'XX'. In either case, the two or 'N' light beams are deflected to create two or 'N' corresponding scanning beams that include a first scanning beam, and a second scanning beam spaced a beam separation distance "d" of 1 pixel or greater, in the slow scan direction from the first scanning beam. The control means is adapted for controlling the light source and the polygon assembly so as to initiate producing the periodic halftone pattern of "on" image scan lines 'XX' and of "off" image scan lines 'YY' by creating only the second scanning beam, or the second set of 'n'×'N' scanning beams for forming an equivalent number of image scan lines on in a first pass.

The control means is additionally also adapted for controlling the light source and the polygon assembly to continue producing the periodic halftone pattern of "on" image scan lines 'XX' and of "off" image scan lines 'YY', in subsequent passes, by creating both the first and the second scanning beams (in the case of two beams), or all 'N' scanning beams, for simultaneously producing, in each subsequent pass, two or 'N' additional image scan lines until producing the end-of-scan group of "on" image scan lines 'XX'.

Further, in accordance with the present invention, a method of producing within an imaging area of a charged surface, and without significant banding, an array of pixel spots forming image scan lines, is provided. The formed image scan lines include a start-of-image scan line, and an end-of-image scan line that is spaced in a slow scan direction from the start-of-image scan line. The method includes the step of generating 'N' laser beams for creating 'N' scanning beams. 'N' as above should be an even number, and preferably the number two. The 'N' scanning beams so created include a first set having 'N'/2 scanning beams (i.e. one half tone total number of scanning beams), and a second set also having 'N'/2 scanning beams. The second set of scanning beams is the set spaced in the slow scan direction from the first set of scanning beams.

The method also includes a step of initially creating only one of the two, or one set of the first and the second sets, of scanning beams for producing pixel spots forming one, or 'N'/2 image scan lines within the imaging area. The initially creating step includes initially creating the second beam, or the second set of 'N'/2 scanning beams, for producing pixel spots forming 'N'/2 image scan lines within the imaging area. It then includes the steps of moving the imaging area of the charged surface a desired distance relative to the created one, or created set of scanning beams, and of next creating at most both scanning beams, or both sets of scanning beams, for producing pixel spots forming at most two, or 'N' additional image scan lines within the imaging area. Finally, the method includes the step of repeating the moving step and the next creating step until producing pixel spots forming the end-of-image scan line.

In the method as above, the moving step includes moving the imaging area of the charged surface a desired distance, in a direction opposite to the slow scan direction, equal to two, or 'N' image scan lines, relative to the second beam, or set of the 'N'/2 scanning beams. The next creating step includes creating both beams or sets of scanning beams, in subsequent passes, for producing pixel spots forming two, or 'N' additional image scan lines when the number of image scan lines to be formed in the imaging area is at least greater than 3, or 1.5×'N'.

In accordance with the present invention, the method includes a step of maintaining in an "off" state, the first light beam or the 'N'/2 light beams of the first set of the 'N' scanning beams, while using the second scanning beam, or second set of scanning beams to form the one, or 'N'/2 image scan lines within the imaging area. In order to further suppress banding, the generating step includes generating the second scanning beam, or second set of scanning beams so that adjacent beams are spaced apart a distance of "d" pixels, where "d" is equal to 'F'−1 pixels, and 'F' is a number of facets of a rotating polygon assembly for deflecting the laser beams to create the scanning beams. Additionally, the initially creating step includes offsetting the even number 'N' of corresponding scanning beams relative to the start-of-image scan line such that the second, or 'N'/2+1 scanning beam in the slow scan direction is aligned to produce pixel spots forming the first image scan line within the imaging area.

In general, the method of producing within an imaging area of a charged surface and without significant banding, an array of pixel spots forming image scan lines includes the steps of generating an even number of light beams, and of rotating a polygon assembly having a plural number of facets 'F' for each deflecting the even number of light beams onto the imaging area of the charged surface to simultaneously each form an image line. The method in general also includes the step of controlling the even number of light beams so that at the start-of-producing the pixel spots forming the image scan lines, the even number of light beams is offset relative to the imaging area so that only one-half the even number of light beams is deflected onto the imaging area of the charged surface to each form an image scan line. The rotating step includes rotating a polygon assembly having the plural number of facets 'F' for each deflecting the even number of light beams to create an equal even number of scanning beams spaced a separation distance "d" of 1 scan line or greater, from one another in the slow scan direction.

Additionally, the controlling step includes controlling the even number of light beams so that relative to the slow scan direction only the downstream half of the even number of light beams is deflected, at the start-of-producing pixel spots, onto the imaging area of the charged surface to each form an image scan line. However, when the separation distance "d" between adjacent beams is greater than 'F'−1, the controlling step should instead include controlling the even number of light beams so that relative to the slow scan direction only the upstream half of the even number of light beams is deflected, at the start-of-producing pixel spots, onto the imaging area of the charged surface to each form an image scan line.

It is, therefore, apparent that there has been provided in accordance with the present invention, a ROS scanning method and apparatus that fully satisfy the banding suppression aims and advantages as set forth above.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A raster output scanning, ROS, apparatus for forming within an imaging area of a charged surface, and without a significant banding effect from wobble of the ROS apparatus, an array of image scan lines including a start-of-image scan line, and an end-of-image scan line spaced in a slow scan direction from the start-of-image scan line, the ROS apparatus comprising:
    (a) at least one light source for generating two light beams;
    (b) a rotatable polygon assembly for deflecting said two light beams to create two corresponding scanning beams for simultaneously forming two image scan lines, said two corresponding scanning beams including a first scanning beam, and a second scanning beam spaced in the slow scan direction from said first scanning beam; and
    (c) control means connected to said light source and to said rotatable polygon assembly for controlling said light source and said rotatable polygon assembly (i) to initiate forming of the array of image scan lines by creating only one of said two scanning beams for forming, in an initial scanning pass, only one image scan line within the imaging area of the charged surface, and (ii) such that during scanning passes subsequent to said initial scanning pass said two light beams are deflected by said rotatable polygon assembly to create said two corresponding scanning beams including said first scanning beam, and said second scanning beam spaced a beam separation distance "d" of greater than 1 pixel from said first scanning beam for forming interlaced image scan lines within the imaging area.

2. The ROS apparatus of claim 1, wherein said light source and said polygon assembly are controlled to create only said second scanning beam for forming one image scan line in said initial pass within the imaging area.

3. The ROS apparatus of claim 2, wherein said light source and said polygon assembly are controlled to create both said first and said second scanning beams for simultaneously forming, in each pass subsequent to the first pass, two image scan lines.

4. The ROS apparatus of claim 3 wherein in order to achieve an increase in banding suppression, said beam separation distance "d" is equal to 'F'−1 pixels, where each image scan line has a width of 1 pixel, and 'F' is a number of facets of said rotatable polygon assembly.

5. The ROS apparatus of claim 4, Wherein said number of facets 'F' of said polygon assembly is eight, and said separation distance "d" is equal to seven pixels.

6. A raster output scanning, ROS, apparatus for forming within an imaging area of a charged surface, and without a significant banding effect from wobble of the ROS apparatus, an array of image scan lines including a start-of-image scan line, and an end-of-image scan line spaced in a slow scan direction from the start-of-image scan line, the ROS apparatus comprising:
    (a) at least one light source for generating two light beams;
    (b) a rotatable polygon assembly for deflecting said two light beams to create two corresponding scanning beams for simultaneously forming two image scan lines, said two corresponding scanning beams comprising a first scanning beam, and a second scanning beam spaced in the slow scan direction from said first scanning beam; and
    (c) control means connected to said light source and to said rotatable polygon assembly for controlling said light source and said polygon assembly to create said first scanning beam, and said second scanning beam such that said second scanning beam is spaced a beam separation distance "d" of greater than 1 pixel from said first scanning beam, and such that said beam separation distance "d" is equal to 'F'−1 pixels, where each beam has a scanning width of 1 pixel, and 'F' is a number of facets of said rotatable polygon assembly.

7. A raster output scanning, ROS, apparatus for forming within an imaging area of a charged surface, and without a significant banding effect from wobble of the ROS apparatus, an array of image scan lines including a start-of-image scan line, and an end-of-image scan line spaced in a slow scan direction from the start-of-image scan line, the ROS apparatus comprising:
    (a) at least one light source for generating 'N' light beams, 'N' being an even number;
    (b) a rotatable polygon assembly for deflecting said 'N' light beams to create 'N' corresponding scanning beams for simultaneously forming 'N' image scan lines, said 'N' corresponding scanning beams including a first set of 'N'/2 scanning beams, and a second set of 'N'/2 scanning beams spaced in the slow scan direction from said first set of scanning beams; and
    (c) control means connected to said light source and to said rotatable polygon assembly for controlling said light source and said rotatable polygon assembly (i) to initiate forming of the array of image scan lines by creating only one of the first and the second sets of scanning beams for simultaneously forming, in an initial pass, only 'N'/2 image scan lines within the imaging area of the charged surface, and (ii) such that said light source and said polygon assembly are controlled to create both said first set and said second set of scanning beams for simultaneously forming, in each pass subsequent to said initial pass, 'N' image scan lines, until forming the end-of-image scan line.

8. The ROS apparatus of claim 7, wherein said light source and said polygon assembly are controlled to create only said second set of scanning beams for forming 'N'/2 image scan lines in said initial pass within the imaging area.

9. A raster output scanning, ROS, apparatus for forming in several passes within an imaging area of a charged surface, and without a significant banding effect from wobble of the ROS apparatus, a periodic halftone pattern of an even number of "on" image scan lines, and even number "off" image scan lines, including a start-of-image group of "on" image scan lines, and an end-of-image group of "on" image scan lines, the (ROS) apparatus comprising:

(a) at least one light source for generating 'N' light beams, 'N' being an even number;

(b) a rotatable polygon assembly for deflecting said 'N' light beams to create 'N' corresponding scanning beams for simultaneously forming, in one pass, 'N' image scan lines, said 'N' corresponding scanning beams including a first set of 'N'/2 scanning beams, and a second set of 'N'/2 scanning beams spaced in a slow scan direction from said first set of scanning beams; and (c) control means connected to said light source and to said rotatable polygon assembly for controlling said light source and said rotatable polygon assembly to initiate forming of the periodic halftone pattern of "on" image scan lines and "off" image scan lines by creating only one set of said first and said second set of scanning beams for simultaneously forming, in an initial pass, only 'N'/2 of the start-of-scan group of "on" image scan lines.

10. The ROS apparatus of claim 9, wherein said light source and said polygon assembly are controlled to create only said second set of scanning beams for forming, in said initial pass, only 'N'/2 image scan lines.

11. A method of producing within an imaging area of a charged surface and without significant banding, an array of pixel spots forming image scan lines including a start-of-image scan line, and an end-of-image scan line spaced in a slow scan direction from the start-of-image scan line, the method comprising the steps of:

(a) generating two laser beams for creating two scanning beams, the two scanning beams including a first scanning beam, and a second scanning beam spaced in the slow scan direction from the first scanning beam;

(b) initially creating only one of the first and the second scanning beams for producing pixel spots forming one image scan line within the imaging area;

(c) moving the imaging area of the charged surface a desired distance relative to the created scanning beam;

(d) next creating at most both the first and the second scanning beams for producing pixel spots forming at most two additional image scan lines within the imaging area; and (e) repeating said moving step and said next creating step until producing pixel spots forming the end-of-image scan line.

12. The method according to claim 1, wherein said initially creating step comprises creating the second scanning beam for producing pixel spots forming one image scan line within the imaging area.

13. The method according to claim 11, wherein said next creating step comprises creating both the first and the second scanning beams, in subsequent passes, for producing pixel spots forming two additional image scan lines when a number of image scan lines to be formed in the imaging area is at least greater than 2.

14. The method according to claim 12, including a step of maintaining in an "off" state, the one laser beam comprising the first scanning beam while using the second scanning beam to form the one image scan line within the imaging area.

15. A method of producing within an imaging area of a charged surface and without significant banding, an array of pixel spots forming image scan lines including a start-of-image scan line, and an end-of-image scan line spaced in a slow scan direction from the start-of-image scan line, the method comprising the steps of:

(a) generating 'N' laser beams for creating 'N' scanning beams, 'N' being an even number, and the 'N' scanning beams including a first set of scanning beams having 'N'/2 scanning beams, and a second set of scanning beams having 'N'/2 scanning beams spaced in the slow scan direction from the first set of scanning beams;

(b) initially creating only one of the first and the second sets of scanning beams for producing pixel spots forming 'N'/2 image scan lines within the imaging area;

(c) moving the imaging area of the charged surface a desired distance relative to the created set of scanning beams;

(d) next creating at most both sets of scanning beams for producing pixel spots forming at most 'N' additional image scan lines within the imaging area; and (e) repeating said moving step and said next creating step until producing pixel spots forming the end-of-image scan line.

16. The method according to claim 15, wherein said initially creating step includes offsetting the even number 'N' of corresponding scanning beams relative to the start-of-image scan line such that the 'N'/2+1 scanning beam in the slow scan direction is aligned to produce pixel spots forming the start-of- scan image scan line.

17. A method of producing within an imaging area of a charged surface and without significant banding, an array of pixel spots forming image scan lines including a start-of-image scan line, and an end-of-image scan line spaced in a slow scan direction from the start-of-image scan line, the method comprising the steps of:

(a) generating an even number of light beams;

(b) rotating a polygon assembly having a plural number 'F' of facets for each deflecting the even number of light beams onto the imaging area of the charged surface to simultaneously each form an image line; and (c) controlling the even number of light beams so that at start-of-producing the pixel spots forming the image scan lines, only one-half the even number of light beams is deflected onto the imaging area of the charged surface to each form an image scan line.

18. The method of claim 17, wherein said controlling step comprises controlling the even number of light beams so that relative to the slow scan direction only the downstream half of the even number of light beams is deflected, at start-of-producing pixel spots, onto the imaging area of the charged surface to each form an image scan line.

* * * * *